United States Patent [19]

Landolt et al.

[11] 4,359,400

[45] Nov. 16, 1982

[54] CATALYST REGENERATION PROCEDURE

[75] Inventors: George R. Landolt, Audobon; William D. McHale, Swedesboro; Hans J. Schoennagel, Lawrenceville, all of N.J.

[73] Assignee: Mobil Oil Corporation, New York, N.Y.

[21] Appl. No.: 228,855

[22] Filed: Jan. 27, 1981

[51] Int. Cl.³ .................... B01J 23/96; B01J 23/46; C10G 35/09
[52] U.S. Cl. ................... 252/415; 208/140; 252/441; 252/442
[58] Field of Search ................ 252/415, 441; 208/140

[56] References Cited
U.S. PATENT DOCUMENTS 2,785,138 3/1957 Milliken, Jr. .................. 252/415
3,939,061 2/1976 Paynter et al. ................. 252/415

*Primary Examiner*—P. E. Konopka
*Attorney, Agent, or Firm*—Charles A. Huggett; Michael G. Gilman; Charles J. Speciale

[57] ABSTRACT

Supported multi-metallic platinum-containing hydrocarbon conversion catalysts which are at least partially deactivated due to the deposition of carbonaceous residues thereon during contact with hydrocarbons are regenerated by (1) contacting the catalyst with oxygen to burn at least a portion of the carbonaceous residues from the catalyst, (2) contacting the carbonaceous residue depleted catalyst with hydrogen at an elevated temperature to convert a substantial portion of the non-platinum component present in the catalyst to its metallic form, (3) contacting the reduced catalyst with dry hydrogen chloride in the absence of oxygen, (4) treatment of the hydrogen chloride treated catalyst with chlorine, and (5) reduction of the chlorine treated catalyst with a reducing agent, such as hydrogen.

29 Claims, 5 Drawing Figures

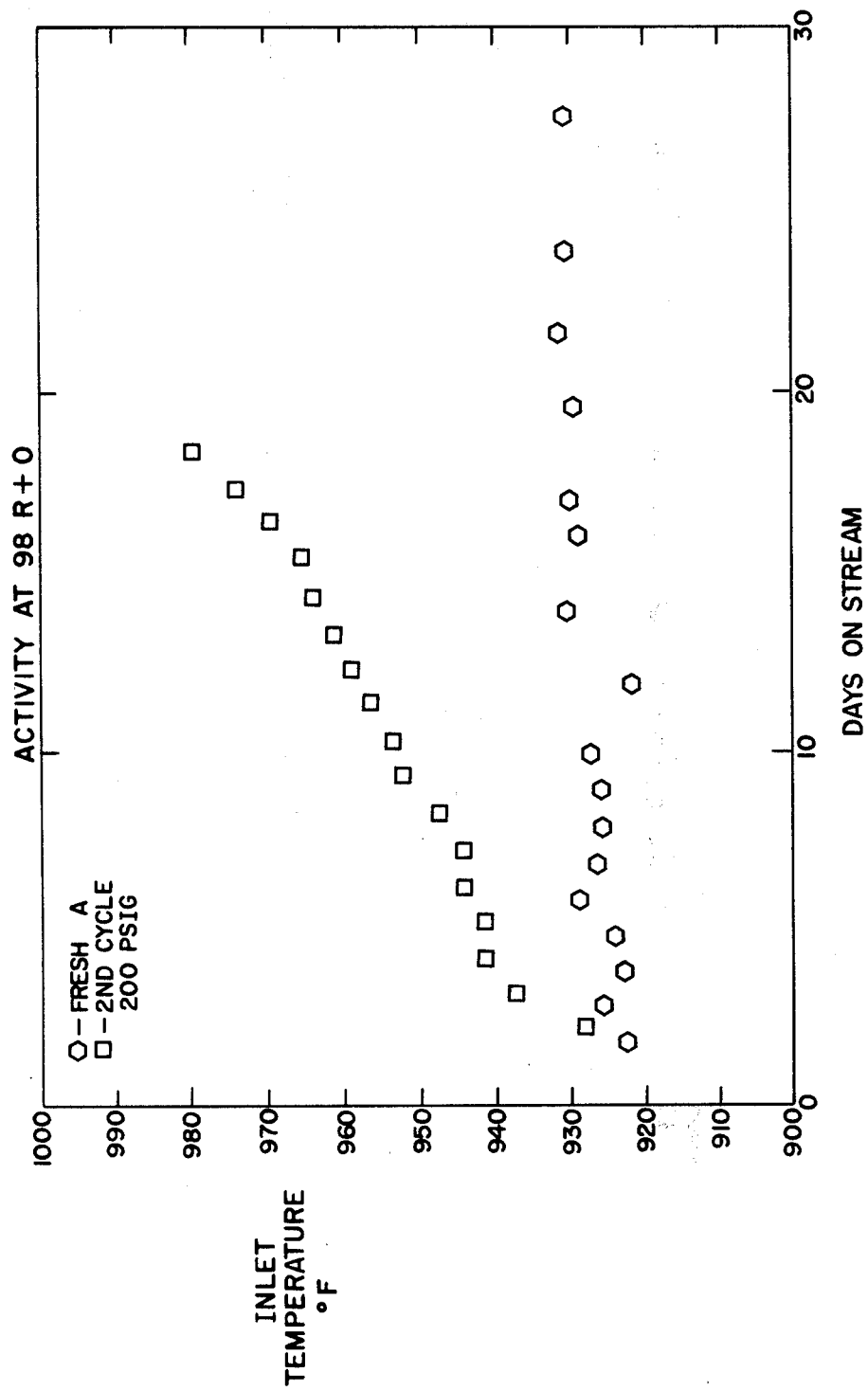

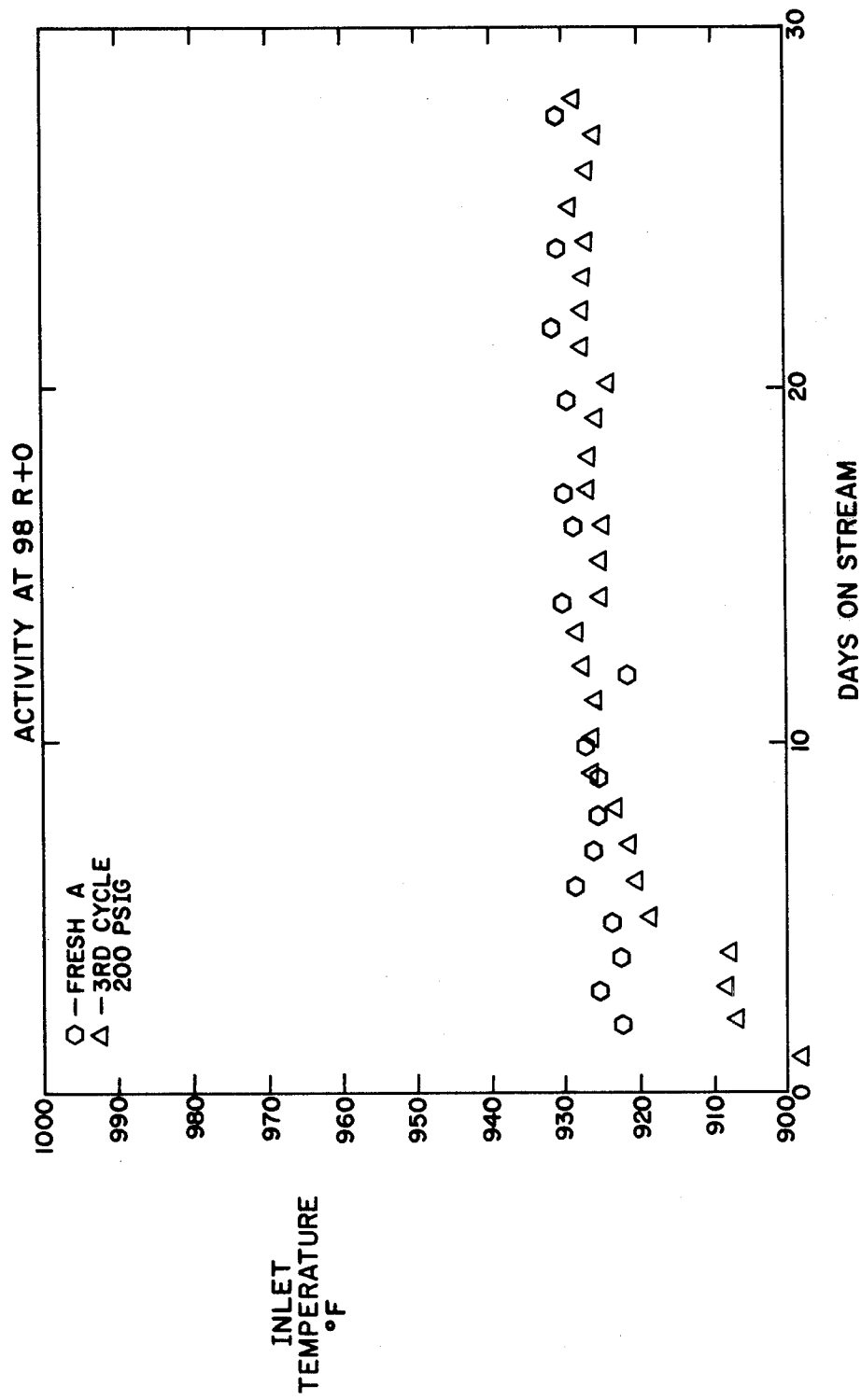

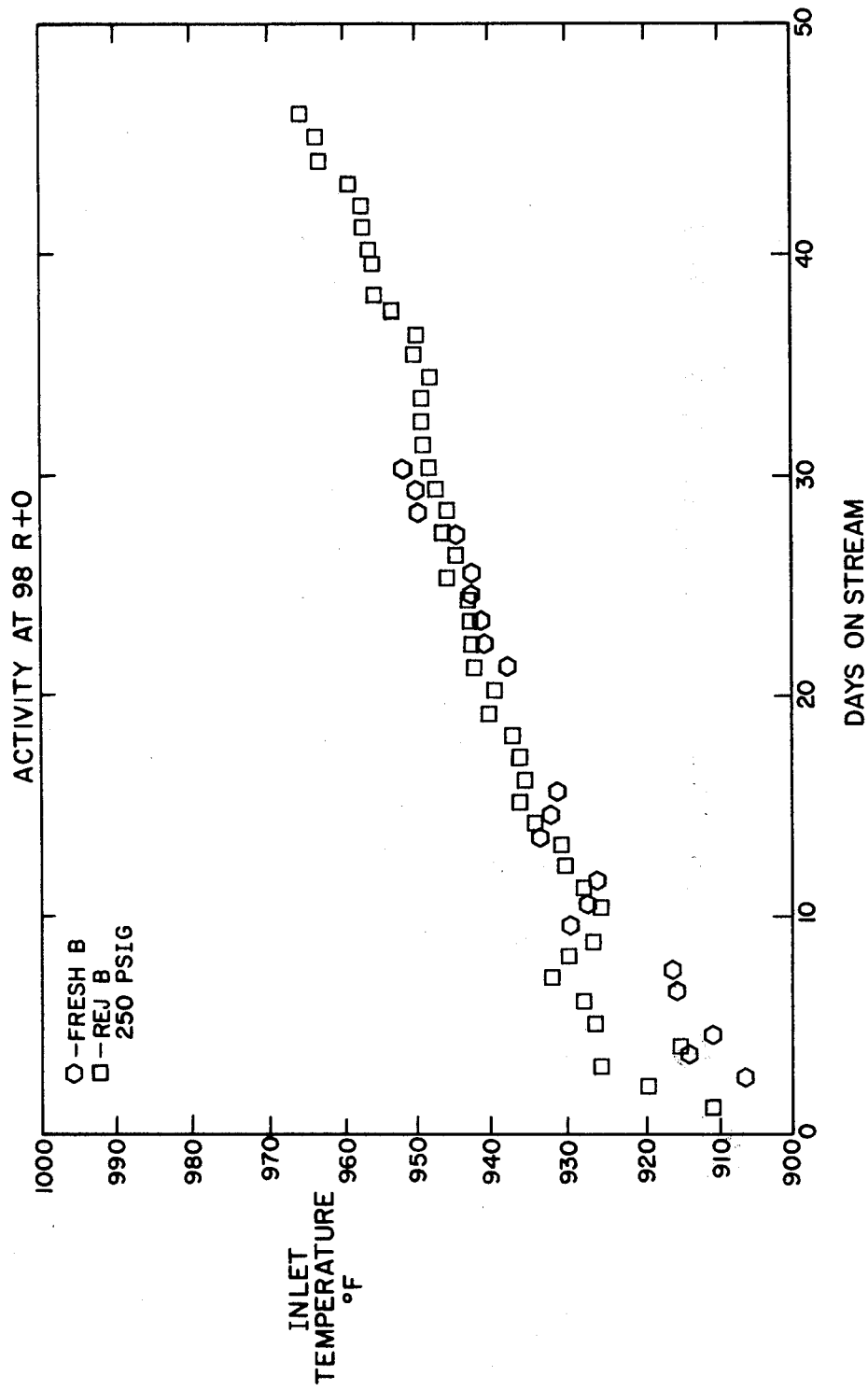

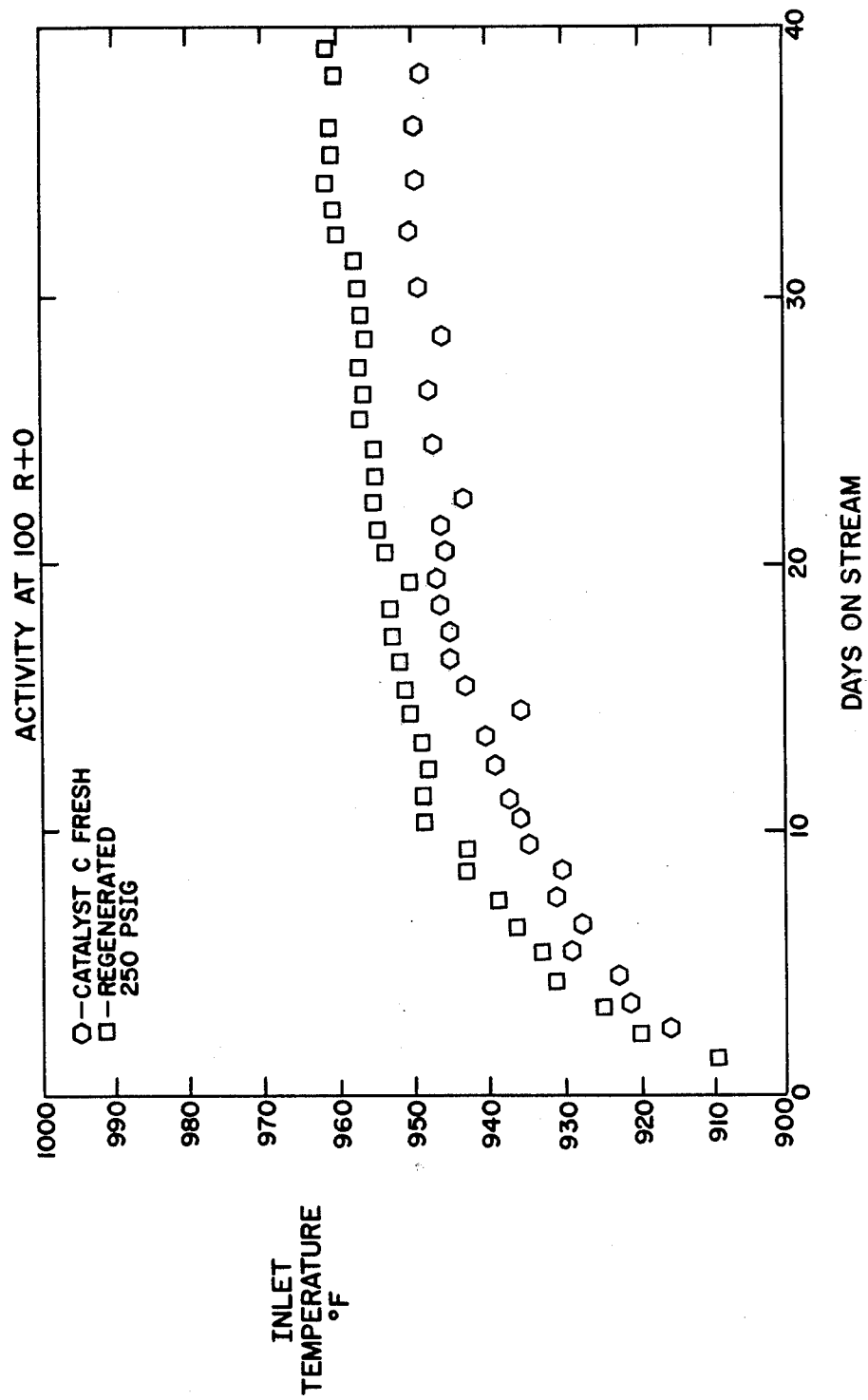

CATALYST REGENERATION PROCEDURE

BACKGROUND OF THE INVENTION

1. Field of the Invention

The present invention relates to a method for regenerating multi-metallic platinum-containing hydrocarbon conversion catalysts. In a preferred embodiment, the present invention relates to a process for regenerating supported hydrocarbon conversion catalysts, containing both platinum and iridium which have been deactivated by the deposition of carbonaceous residues thereon during contact with a hydrocarbon feedstock at elevated temperatures.

2. Description of the Prior Art

The deactivation of noble metal-containing hydrocarbon conversion catalysts due to the deposition on the catalyst of carbonaceous residues is a well known phenomenon which has received much attention in the technical and patent literature. The problem with regard to catalyst deactivation is particularly acute with respect to supported noble metal-containing catalysts employed in the hydroforming of naphtha feedstocks.

Numerous methods have been suggested by prior workers for the regeneration of supported noble metal catalysts which have been deactivated by the deposition of carbonaceous residues. In U.S. Pat. Nos. 2,916,440; 3,243,384; 3,201,355; and 3,654,182 there are disclosed procedures utilizing gaseous mixtures containing oxygen and a halogen or halogen compound, particularly hydrogen chloride for combustion of a carbonaceous residue. Further in U.S. Pat. No. 3,378,419 there is disclosed the procedure for the regeneration of supported platinum catalysts involving (a) addition of halogen to the catalyst while in contact with the process feedstock; and (b) burning the coke deposits from the catalyst with an oxygen-containing halogen free regeneration gas. The prior art has also recognized that regeneration procedures previously practiced are not adequate for the regeneration of iridium-containing catalysts. Iridium-containing catalysts have been recognized as requiring special regeneration procedures in order to prevent the agglomeration of iridium and, in this connection, numerous patents have issued on various techniques for the regeneration of iridium-containing catalysts. Representative of such patents are U.S. Nos. 3,904,510; 3,937;660; 3,939,062; 3,941,682; 3,941,716; 3,943,052; 3,981,823; 3,998,755; 4,046,673; and 4,172,817.

Many of the prior art teachings with regard to the regeneration of multi-metallic platinum-containing catalysts and, in particular, platinum and iridium-containing catalysts were concerned with the prevention of or minimization of, the agglomeration of the non-platinum component during the coke burning step and all sorts of procedures were devised and disclosed in order to prevent said non-platinum component from agglomerating. Additionally, the prior art processes, in general, required very complex regeneration schemes which, in most cases, had to be repeated and did not lend themselves to ensuring an attractive regeneration process.

SUMMARY OF THE INVENTION

In accordance with the present invention, there has been discovered that a very attractive and simplified regeneration process can be obtained which has for its major criticality contact of the multi-metallic platinum-containing catalysts with a dry, oxygen-free, hydrogen halide stream subsequent to the carbon burning step. While not wishing to be bound by any theory of operation, nevertheless, it is known that reduced metals, such as iridium react with oxygen, thereby making it difficult to redisperse. Oxygen is detrimental to the catalyst when it is present subsequent to the coke burning operation, either as air, oxygen, or by generation of oxygen via the reaction of chlorine with water or hydroxyl groups. The novel process of this invention is predicated upon the fact that either oxygen or oxygen generation can be avoided by removing water and hydroxyl groups prior to exposing the multi-metallic platinum-containing catalyst to chlorine treatment. This is accomplished by contacting the multi-metallic platinum-containing catalyst subsequent to coke burning with dry hydrogen chloride which then enables the chlorine which is subsequently applied to effectively redisperse the non-platinum metals, particularly the iridium.

One important benefit resulting from the novel process of this invention is that no particular precautions are necessary in carrying out the coke burning step. As has heretofore been stated in the prior art, the coke burning step was controlled either by limiting the temperature or limiting the oxygen during oxidation of the carbonaceous material in order to minimize the agglomeration of the non-platinum components such as iridium. In the novel process of this invention, such control of the coke burning step is not necessary. In fact, very elevated temperatures can be tolerated and sufficient quantities of oxygen can be present such that the coke is effectively removed.

DESCRIPTION OF THE PREFERRED EMBODIMENTS

Figure 1:
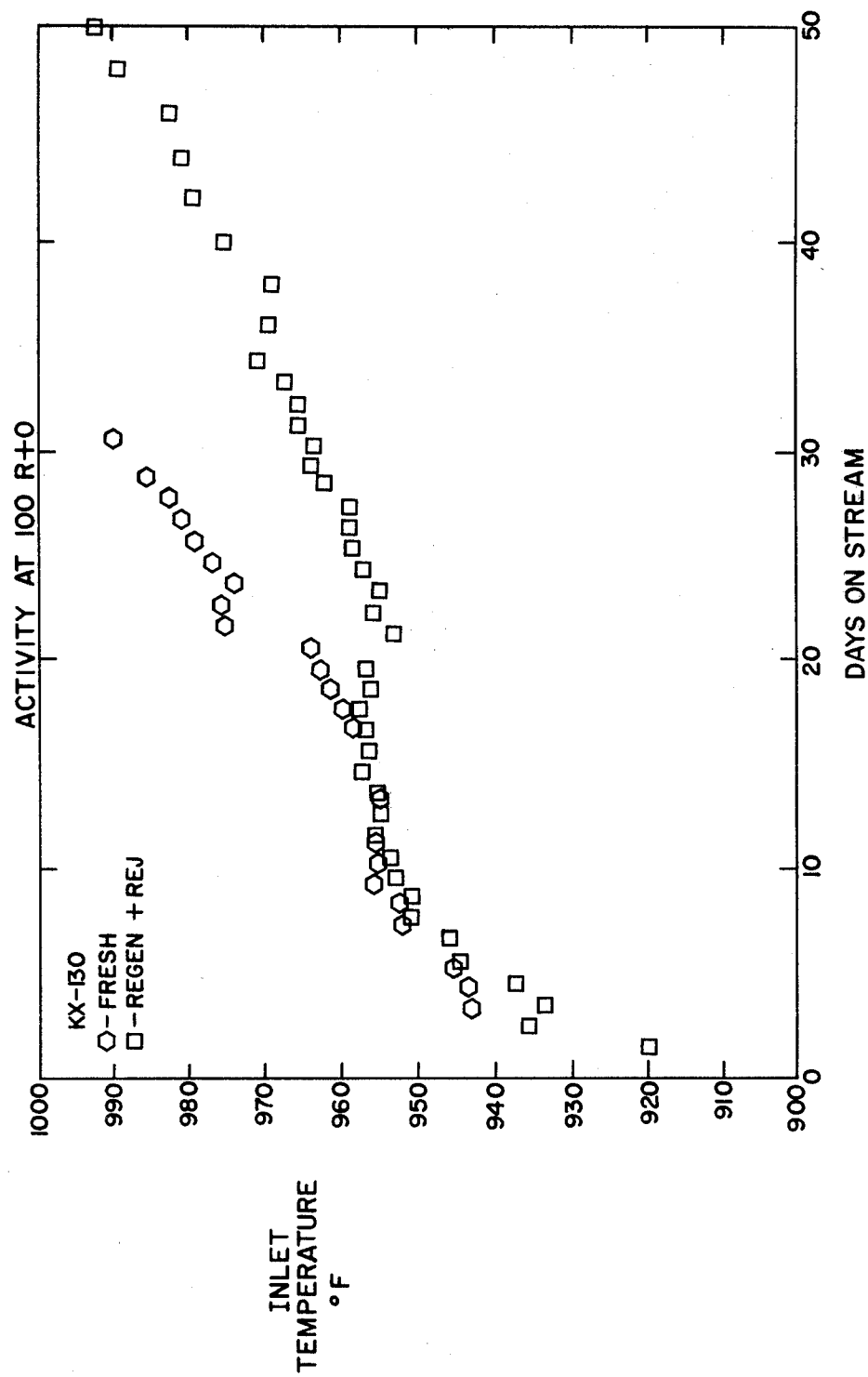

The novel process of this invention is carried out by treating a spent multi-metallic platinum-containing catalyst and, in particular, a platinum and iridium-containing catalyst, with oxygen or an oxygen-containing gas such as air at elevated temperatures until all or a substantial portion of the carbon is removed. As has heretofore been indicated, this coke burning step is not narrowly critical and suitable conditions range from temperatures of 500° to 1000° F. or even higher and oxygen concentration can range from 0.1 to 10 mol percent. The period of time at which the coke burning step is carried out is also not narrowly critical and will obviously vary depending on the temperature which is employed as well as oxygen concentration and the amount of coke on catalyst. Preferred operating conditions for the coke burning step would be treatment of a spent catalyst with about 0.2 to 7 mol percent of oxygen at temperatures of about 700° to 850° F. at atmospheric to 500 psig.

The next step in the novel process of this invention is the reduction of a catalyst with hydrogen or hydrogen-containing gas in order to convert the noble metal, particularly iridium into its elemental form. This step is also not narrowly critical and is well known in the prior art. The preferred reduction agent is hydrogen and temperatures usually employed range from 500° to 1000° F. for periods of time ranging from 1 to 24 hours. The pressure of hydrogen is not narrowly critical but usually ranges from atmospheric to 500 psig.

The third step in the novel process of this invention is treatment of the reduced catalyst with a dry hydrogen halide which is preferably hydrogen chloride, in the absence of any source of oxygen. The expression "dry hydrogen halide" is intended to mean that water is controlled to a level no greater than 1/30 the concentration of hydrogen halide. Preferably, water is present at a level no greater than 10 ppm. Commercially available hydrogen chloride is suitable as is, i.e. no drying step is necessary. However, water should not be introduced into the system via leaks, impurities, etc. The treatment with dry hydrogen halide is carried out at temperatures ranging from about 700°–1000° F. for a period of time ranging from about 0.5 to about 24 hours utilizing at least 0.1 weight percent of hydrogen halide per weight of catalyst. The amount of hydrogen halide used is generally no greater than about 10 weight percent per weight of catalyst since higher amounts, although operable, are not necessary to obtain the desired results. The treatment with dry hydrogen halide can be carried out at pressures ranging from about 0.1 to 500 psig.

As has heretofore been indicated, it appears that treatment with hydrogen chloride dries the catalyst and renders it more susceptible to redispersion when subsequently treated with chlorine.

The next step in the novel process of this invention is a chlorine activation which must be carried out in the substantial absence of oxygen or source of oxygen, i.e. water. The activation procedure with chlorine is also not narrowly critical and can be carried out at temperatures ranging from 850° to 1100° F. and, more preferably, from 900°–1000° F. for a period of time ranging from 0.5 to 24 hours with from 0.1 to 5.0 weight percent chlorine per weight of catalyst. Commercially available chlorine is suitable.

The last step in the novel process for the regeneration of the catalyst is treatment of the same with a reducing agent which is typically hydrogen. Conditions include temperatures ranging from 400° to 1100° F. for periods of time ranging from 0.1 to 24 hours. It is to be understood that this last step, i.e. reduction with hydrogen, can be carried out either as a separate step or can be carried out as part of the reformer start-up procedure.

In a particularly preferred embodiment of this invention, the treatment with the hydrogen chloride is carried out by mixture of the same with an inert diluent such as nitrogen. The amount of inert gas is not critical and can range from about 90 to 99.9 volume percent, based on the dry hydrogen chloride.

The supported multi-metallic platinum-containing catalyst composites that are regenerated by the process of the present invention comprise a porous carrier or support material in combination with platinum and at least one other metal, such as iridium, rhenium, tin, gallium, etc. and, for certain uses, a halogen component. The support component of the catalyst is preferably a porous, adsorptive material having a surface area, as determined by the Brunauer-Emmett-Teller (BET) method, of about 20 to 800, preferably 100–300 square meters per gram. This support material should be substantially refractory at the temperature and pressure conditions utilized in any given hydrocarbon conversion process. Useful support materials include: (a) silicon-based materials such as silica or silica gel, silicon carbide, clays, natural or synthetic silicates such as keiselguhr, kaolin, china clay, Attapulgus clay, etc.; (b) aluminosilicate zeolite materials such as naturally occurring or synthetic erionite, mordenite, faujasite, etc. that may or may not be previously converted to a hydrogen or ammonium form and reduced in soda content by virtue of an exchange reaction with various metal cations, including rare earth metal cations; (c) refractory inorganic oxides, including alumina, titanium dioxide, zinc oxide, magnesia, thoria, chromia, silica-alumina, alumina-titania; silica-zirconia, alumina-chromia, etc. and (d) mixtures of one or more of the materials referred to above.

Refractory inorganic oxide materials are preferred catalyst support materials. In general, superior results are obtained when alumina, in particular the gamma or eta forms, is employed. Alumina is the preferred catalyst support material when the catalyst is employed in naphtha reforming operations. The support materials described above are known articles of commerce and can be prepared for use as catalyst constituents by many varied techniques. Typically, the support materials are prepared in the form of spheres, granules, powders, extrudates of pellets. The precise size or shape of the support material used is dependent upon many engineering factors not within the purview of the instant invention. It is also within the scope of this invention to have all the metals of the multi-metallic platinum-containing catalyst on the same support in one paticle, e.g. platinum and iridium on alumina, or as a mixture of separate particles, e.g. platinum on alumina mixed with iridium on alumina. When mixtures of separate particles are used, the supports can be the same or different. Separate particle multi-metallic platinum-containing catalysts are disclosed and claimed in copending application Ser. No. 76,047, filed Oct. 30, 1979, the entire disclosure of which is incorporated by reference.

As noted above, the regeneration process of the instant invention is particularly adapted to the treatment of deactivated catalysts containing both platinum and iridium, either by themselves or in conjunction with one or more additional catalyst metals selected from copper, silver, gold, iron, cobalt, nickel, tungsten, molybdenum, chromium, palladium, rhodium, ruthenium, osmium, manganese of rhenium. The catalysts may also contain germanium, tin or lead.

In the platinum-iridium catalysts, certain minimum amounts of iridium should be present on the catalyst. This is particularly true with respect to catalysts employed in a naphtha reforming operation where the catalyst should contain greater than about 0.1 weight percent iridium, based upon the dry weight of the total catalyst. For other types of operations, lesser quantities of iridium may be employed. Specifically, iridium and platinum may each be present on the catalyst in amounts varying from about 0.01 to about 3.0 weight percent, preferably in amounts varying from about 0.1 to about 1.0 weight percent, based upon the total weight of the dry catalyst. Typically, any additional catalyst metals, such as rhenium, are present in the catalyst in amounts varying from about 0.01 to 3.0 weight percent, preferably 0.1 to 1.0 weight percent, based upon the dry weight of the catalyst. Iridium/platinum naphtha reforming catalysts having maximum effectiveness normally contain 0.15 to 1.0 weight percent each, preferably about 0.15 to 0.5 weight percent each, of iridium and platinum, based on total catalyst.

The multi-metallic platinum-containing catalysts may be prepared employing simple impregnation techniques. Such a catalyst may be prepared by impregnating a support material with a solution of a soluble platinum compound and soluble compounds of any additional metals to be incorporated in the catalyst. Generally, an aqueous solution of the metal compounds is used. The support material may be impregnated with the various metal-containing compounds either sequentially or simultaneously. The carrier material is impregnated with solutions of appropriate concentration to provide the desired quantity of metals in the finished catalyst. In the case of iridium, compounds suitable for the impregnation onto the carrier include, among others, chloroiridic acid, iridium tribromide, iridium trichloride, and ammonium chloroiridate. In the case of platinum, compounds such as chloroplatinic acid, ammonium chloroplatinate, and platinum amine salts can be used. Additional catalyst metals may be incorporated onto the support by employing compounds such as perrhenic acid, ruthenium trichloride, rhodium trichloride, rhodium nitrate, palladium chloride, palladium amine salts, osmium trichloride, chloroosmic acid, auric chloride, chloroauric acid, silver nitrate, copper nitrate, copper chloride, ferric nitrate, cobalt nitrate, nickel nitrate, etc. The preferred catalyst manufacturing technique involves contacting a previously prepared support, such as alumina with an aqueous solution of an iridium and platinum compound, alone or in combination with a compound of at least one additional catalyst metal.

After impregnation of the carrier, the composite catalyst is dried at a temperature varying from about 220° to 250° F. The catalyst may be dried in air at the above stated temperatures or may be dried by treating the catalyst in a flowing stream of inert gas or hydrogen. The drying step may be followed by an additional calcination step at temperatures of about 500° to 700° F. Care must be taken to avoid contacting the catalyst at temperatures in excess of about 700° F. with air or other gases of high oxygen concentration. If the catalyst is contacted with oxygen at too high a temperature, at least a portion of the non-platinum component, such as iridium, will be oxidized, with loss of surface area, to crystallites of iridium oxide. However, in such case the novel process of this invention can be applied to the fresh catalyst and redispersion of the non-platinum component will be obtained.

Additional materials may be added to the platinum-containing catalyst composites to assist in the promotion of various types of hydrocarbon conversion reactions for which the catalyst might be employed. For example, the naphtha reforming activity of the catalyst is enhanced markedly by the addition of a halogen moiety, particularly a chlorine or fluorine moiety, to the catalyst. The halogen should be present in the catalyst in amounts varying from about 0.1 to about 3.0 weight percent, based on the total dry weight of the catalyst. The halogen may be incorporated into the catalyst at any suitable stage in the catalyst manufacturing operation, i.e. before, during or after incorporation of the active metal component onto the support material. Halogen is often incorporated into the catalyst by impregnating the support with halogen-bearing metal compounds such as chloroiridic acid. Further amounts of halogen may be incorporated in the catalyst by contacting it with hydrogen fluoride, ammonium fluoride, hydrogen chloride, or ammonium chloride, either prior to or subsequent to the impregnation step. Other components may also be added to the catalyst composite. For example, the catalyst may be sulfided before or during use. For certain applications other than naphtha reforming, alkali or alkaline earth metal compounds may be added to the catalyst.

The multi-metallic platinum-containing catalyst composites may be used to promote a wide variety of hydrocarbon conversion reactions such as hydrocracking, isomerization, dehydrogenation, hydrogenation, alkylation, polymerization, cracking and the like. The catalysts are particularly useful in promoting the dehydrogenation, isomerization, dehydrocyclization and hydrocracking reactions that occur in a naphtha hydroforming process.

In a naphtha hydroforming process (reforming) a substantially sulfur-free naphtha stream that typically contains about 15 to 80 volume percent paraffins, 15 to 80 volume percent naphthenes and about 2 to 20 percent aromatics and boiling at atmospheric pressure substantially between about 80° and 450° F., preferably between about 150° and 375° F., is contacted with the platinum-containing catalyst composite in the presence of hydrogen. The reactions typically occur in a vapor phase at a temperature varying from about 650° to 1000° F., preferably about 750° to 980° F. Reaction zone pressures may vary from about 1 to 50, preferably from about 5 to 30 atmospheres. The naphtha feed stream is passed over the catalyst composite at space velocities varying from about 0.5 to 20 parts by weight of naphtha per hour per part by weight of catayst (W/hr/W), preferably from about 1 to 10 W/hr/W. The hydrogen to hydrocarbon mole ratio within the reaction zone is maintained between about 0.5 to 20, preferably between about 1 and 10. During the reforming process, the hydrogen used may be in admixture with light gaseous hydrocarbons. In a typical operation, the catalyst is maintained as a fixed bed within a series of adiabatically operated reactors. The product stream from each reactor (except the last) in the reactor train is reheated prior to passage to the following reactor. As an alternate to the above-described process, the catalyst may be used in a moving bed in which the naphtha charge stock, hydrogen and catalyst are passed in parallel through the reactor or in a fluidized system wherein the naphtha feed stock is passed upwardly through a turbulent bed of finely divided catalyst particles. Finally, if desired, the catalyst may be simply slurried with the charge stock and the resulting mixture conveyed to the reaction zone for further reaction.

Regardless of the hydrocarbon conversion reaction in which the multi-metallic platinum-containing catalyst composites are employed, the catalyst tends to deactivate after use due at least in part to the formation of coke or carbonaceous residues on the surface of the catalyst. The carbonaceous residues on the surface of the catalyst cover the active catalyst sites and thus decrease activity. Accordingly, it becomes necessary to remove the carbonaceous deposits from the catalyst in order to return the catalyst to an economically viable activity level.

Turning now in more detail to the regeneration process of the present invention, the first step in the regeneration sequence consists of treating the catalyst with oxygen or an oxygen-containing gas to burn at least a portion of the accumulated carbonaceous deposits from the catalyst. The burning operation is conducted preferably at a temperature not exceeding about 1200° F., most preferably at a temperature not exceeding about 1000° F. The coke burning operation is normally carried out by contacting the catalyst with oxygen contained in significant concentrations in an inert gas, preferably nitrogen, i.e. air. Oxygen concentrations, typically varying between 0.2 to 7 mole percent of the total treating gas, are desirable in order to maintain a burning temperature of about 850° F. Preferably the gas mixture used is substantially sulfur-free. Reaction zone pressures during the burning operation vary from about 0.1 to 30 atmospheres, preferably 1 to 10 atmospheres. The burning operation is remarkably effective for the substantially complete removal of carbonaceous residues. The catalyst after completion of the burning operation, desirably contains less than about 0.1 weight percent carbonaceous residues, based upon the dry weight of the total catalyst.

The catalyst is then subjected to a reduction treatment wherein the catalyst is contacted with hydrogen at a temperature varying from about 400° to 1100° F., preferably from about 650° to about 950° F. in order to convert (reduce) a substantial portion of the metals present on the catalyst to their metallic state. The third step in the treatment of the catalyst is crucial. This is the previously described dry hydrogen halide treatment. Hydrogen halide, in the absence of oxygen or source of oxygen such as water and preferably in admixture with an inert gas (also free of oxygen or source of oxygen) is passed over the reduced catalyst in order to render the non-platinum component such as iridium more susceptible to the next step. This treatment is preferably carried out as a separate step but can be combined with reduction step (2). Hydrogen chloride is the preferred hydrogen halide.

The hydrogen halide treatment is carried out at a temperature varying from 400° to 1100° F., preferably from about 700° to about 1000° F. The amount of hydrogen halide used can range from 0.1 to 10 weight percent hydrogen halide/weight of catalyst and the time can range from 0.5 to 24 hours. This treatment can be carried out at atmospheric pressure although pressures of from 0.1 to 500 psig are operable.

Following the dry hydrogen chloride treatment, the treated catalyst is contacted with an elemental halogen-containing gas, preferably a chlorine-containing gas, at a temperature of 850° to 1100° F., preferably at a temperature of about 950° F. The halogen treatment operation is conducted for a time sufficient to introduce from about 0.1 to 5.0 weight percent, preferably 0.5 to 3.0 weight percent halogen onto the catalyst, based upon the anhydrous weight of the catalyst.

After the catalyst has been pretreated with halogen, preferably chlorine, the catalyst is subjected to a reduction step which is accomplished by contacting the halogen treated catalyst with a hydrogen-containing gas at a temperature varying from about 400° to 1100° F., preferably from about 650° to 950° F. Preferably the treating gas is substantially sulfur free. The contacting of the catalyst with the hydrogen-containing gas is carried out for a time sufficient to convert at least a portion, preferably a substantial portion, of the catalyst to its metallic form. The pressure within the contacting zone during reduction can vary from about 0.1 to 30, preferably 5 to 20 atmospheres.

The regeneration process of the present invention is generally carried out in situ, that is, the catalyst treated is maintained within the reactor vessels in which the hydrocarbon conversion reactions are carried out. Also the regeneration process may be conducted in a separate regenerator vessel. Typically, the regeneration sequence is commenced by discontinuing contacting the catalyst with the process feedstock and the feedstock purged from the reaction vessels using techniques known to those skilled in the art.

In a specific embodiment of this invention, it has been found that a modification of the above procedure is particularly attractive when reactivating catalysts containing rhenium in addition to platinum with or without other metals such as iridium.

In this embodiment an additional step is introduced in the regeneration sequence previously described. This additional step is carried out between steps 1 and 2, i.e. the coke burning and the reduction and it involves treatment of the spent rhenium catalyst with oxygen and a source of chloride, such as hydrogen chloride, or chlorine, preferably in admixture with an inert gas such as nitrogen as temperatures ranging from 500° to 1000° F., preferably 750°–950° F. This operation is preferably carried out at 1–10 atmospheres, although pressures of 0.1 to 30 atmospheres can be used. The amount of oxygen used is from 0.2 to 7 mol percent and the amount of hydrogen chloride or chlorine that is used is the same as in step (3). It is noted that the hydrogen chloride or chlorine need not be dry since it will be subsequently dried during step (3).

Following this treatment the catalyst is treated in accordance with steps 2, 3, 4, and 5.

Although various treatments of this invention have been described with particular emphasis on spent catalysts, they are also applicable to fresh catalysts in order to modify them prior to initial use.

EXAMPLE 1

A commercially available platinum- and iridium-containing reforming catalyst on alumina identified as "KX-130" prepared according to U.S. Patent 3,953,368 and marketed by Exxon Corporation was used in this example.

The performance of a fresh KX-130 was compared with the performance of a spent KX-130 catalyst taken from a commercial unit and reactivated in accordance with the teachings of the invention as follows:

1. The spent catalyst was heated to a temperature of 900° F. with 5 percent oxygen for 6.5 hours at atmospheric pressure.
2. The oxygen treated catalyst from step (1) was reduced with hydrogen at atmospheric pressure at 900° F. for two hours.
3. The reduced catalyst from step (2) was treated with 1.5 weight percent dry hydrogen chloride in the absence of oxygen per weight of catalyst per hour for two hours at 900° F. at atmospheric pressure.
4. The product of step (3) was treated at atmospheric pressure with 1.5 weight percent $Cl_2$/weight of catalyst/hour for two hours at 900° F.
5. The product of step (4) was treated with hydrogen at atmospheric pressure at 900° F. for 1–2 hours.

The fresh and regenerated catalysts were then evaluated at an octane severity of 100 R+O for the reforming of a $C_6$-350° F. Arab Light Naphtha having the following properties:

|  | Volume Percent |
|---|---|
| Paraffins | 72.0 |
| Naphthenes | 17.0 |
| Aromatics | 12.0 |
| API | 61.6 |
| Sp. Gr. | 0.7350 |
| Sulfur, by wt. | 1.2 |
| Chloride, by wt. | <1.0 |

| Distillation, Vol. % | Temperature, °F. |
|---|---|
| 5 | 186 |
| 10 | 196 |
| 50 | 252 |
| 90 | 322 |

-continued

| | |
|---|---|
| EP | 370 |

The reaction conditions were a pressure of 250 psig, 2.0 WHSV and total recycle ratio of 7:1. The results obtained are shown in FIG. 1 which is a graph of inlet temperature versus days on stream.

As can be seen, the regenerated catalyst resulted in almost twice the cycle length over the fresh catalyst.

EXAMPLE 2

A platinum- and iridium-containing reforming catalyst A on alumina comprising:

| | Wt. % |
|---|---|
| Iridium | 0.3 |
| Platinum | 0.3 | was used in this example. This catalyst was prepared by impregnating iridium and platinum on alumina.

The performances of the fresh catalyst were compared to the performance of a spent catalyst taken from a pilot plant unit and reactivated in accordance with the following procedure.

1. The spent catalyst was heated to a temperature of 850° F. with 5% oxygen for 3.25 hours at atmospheric pressure, followed by 50% oxygen for 1.25 hours at atmospheric pressure.
2. The oxygen treated catalyst from step 1 was treated with 1.5 weight percent dry chlorine per weight of catalyst per hour for 2 hours at 900° F. at atmospheric pressure.
3. The product of step 2 was treated with hydrogen at atmospheric pressure at 850° F.

The fresh and regenerated catalysts were then evaluated at an octane severity of 98 R+O for the reforming of a $C_6$-330° F. Arab Light naphtha having the following properties:

| | Volume Percent |
|---|---|
| Paraffins | 68.0 |
| Naphthenes | 21.0 |
| Aromatics | 11.0 |
| Sp. Gr. | 0.7320 |
| Sulfur, by wt. | <0.2 |
| Chloride, by wt. | <0.1 |

The reaction conditions were at a pressure of 200 psig, 2.5 WHSV and hydrogen recycle ratio of 5:1. The results obtained are shown in FIG. 2 which is a graph of inlet temperature versus days on stream.

As can be seen, the regenerated catalyst resulted in a shortened cycle length over the fresh catalyst. This example illustrates the necessity of step 2 and step 3 as in Example 1.

EXAMPLE 3

The spent catalyst from Example 2 was taken from a pilot plant unit and reactivated in accordance with the teachings of the invention as described in Example 1. Temperature was maintained at 950° F. for steps 2-5.

The fresh and regenerated catalysts were then evaluated at an octane severity of 98 R+O for the reforming of a $C_6$-330° F. Arab Light naphtha having the following properties:

| | Volume Percent |
|---|---|
| Paraffins | 68.0 |
| Naphthenes | 21.0 |
| Aromatics | 11.0 |
| Sp. Gr. | 0.7320 |
| Sulfur, by wt. | <0.2 |
| Chloride, by wt. | <0.1 |

The reaction conditions were a pressure of 200 psig, 2.5 WHSV and hydrogen recycle ratio of 5:1. The results obtained are shown in FIG. 3 which is a graph of inlet temperature versus days on stream.

As can be seen, the regeneration procedure restored the spent catalyst to fresh catalyst performance.

EXAMPLE 4

A platinum- and iridium-containing reforming catalyst B comprising:

| | Wt. % |
|---|---|
| Iridium | 0.3 |
| Platinum | 0.3 | were used in this example. This catalyst was prepared by impregnating platinum on alumina and iridium on alumina as separate particles and mixing the same.

The performance of the fresh catalyst was compared to the performance of a spent catalyst B taken from a pilot plant unit reactivated in accordance with the teachings of the invention as described in Example 1. Pressure was maintained at 100 psig for steps 1-5.

The fresh and regenerated catalysts were then evaluated at an octane severity of 98 R+O for the reforming of a $C_6$-350° F. Arab Light Naphtha having the following properties:

| | Volume Percent |
|---|---|
| Paraffins | 72.0 |
| Naphthenes | 17.0 |
| Aromatics | 12.0 |
| API | 61.6 |
| Sp. Gr. | 0.7350 |
| Sulfur, by wt. | 1.2 ppm |
| Chloride, by wt. | <1.0 ppm |

| Distillation, Vol. % | Temperature, °F. |
|---|---|
| 5 | 186 |
| 10 | 196 |
| 50 | 252 |
| 90 | 322 |
| EP | 370 |

The reaction conditions were at a pressure of 250 psig, 2.0 WHSV and total recycle ratio of 7:1. The results obtained are shown in FIG. 4 which is a graph of inlet temperature versus days on stream.

As can be seen, the regeneration procedure restored the spent catalyst to fresh catalyst performance.

EXAMPLE 5

A platinum- and iridium-containing reforming catalyst C comprising:

| | Wt. % |
|---|---|
| Platinum | 0.3 |
| Iridium | 0.3 |

| | Wt. % |
|---|---|
| Rhenium | 0.3 | was used in this example.

The performance of the fresh catalyst was compared to the performance of a spent catalyst C taken from a pilot plant unit and reactivated in accordance with the following procedure.
1. The spent catalyst was heated to a temperature of 850° F. with 5% oxygen for 12 hours at atmospheric pressure.
2. The oxygen treated catalyst from step 1 was treated with a mixture of 5% oxygen and 1.5 weight percent per hour per weight of catalyst of hydrogen chloride for 2 hours at 900° F. at atmospheric pressure.
3. The catalyst from step 2 was then reactivated in accordance with the teachings of the invention as described in Example 1, steps 1-5, except that in steps 1, 2, 3 and 5 a temperature of 850° F. was used instead of 900° F. and in step 4, a temperature of 950° F. was used instead of 900° F.

The fresh and regenerated catalysts were then evaluated at an octane severity of 100 R+O for the reforming of a $C_6$-350° F. Arab Light naphtha having the following properties:

| | Volume Percent |
|---|---|
| Paraffins | 72.0 |
| Naphthenes | 17.0 |
| Aromatics | 12.0 |
| API | 61.6 |
| Sp. Gr. | 0.7350 |
| Sulfur, by wt. | 1.2 |
| Chloride, by wt. | <1.0 |

The reaction conditions were at a pressure of 250 psig, 2.0 WHSV and total recycle ratio of 7:1. The results obtained are shown in FIG. 5 which is a graph of inlet temperature versus days on stream.

As can be seen, the regeneration procedure restored the spent catalyst to fresh catalyst performance.

What is claimed is:

1. In the process for treatment of a supported multimetallic platinum-containing catalyst wherein said catalyst is contacted with an oxygen-containing gas at elevated temperatures, followed by a first reduction step, followed by treatment with chlorine at elevated temperatures, followed by a second reduction step, the improvement which comprises treating said catalyst with a dry hydrogen halide in the absence of oxygen or a source thereof after or concurrent with the first reduction treatment and carrying out the remaining steps in the absence of oxygen or a source thereof.

2. The process of claim 1 wherein said noble metal catalyst is a platinum- and iridium-containing catalyst.

3. The process of claim 2 wherein said catalyst is at least partially deactivated by deposition of carbonaceous material.

4. The process of claim 3 wherein the dry hydrogen halide is in admixture with an inert gas.

5. The process of claim 4 wherein said inert gas is nitrogen.

6. The process of claim 5 wherein the second reduction step is carried out in situ prior to use of said catalyst for hydrocarbon conversion.

7. The process of claim 1 wherein said platinum-containing catalyst also contains rhenium and prior to the first reduction step said catalyst is treated with a mixture of a chlorine-containing component and oxygen.

8. The process of claim 7 wherein said chlorine-containing component is hydrogen chloride.

9. The process of claim 7 wherein said chlorine-containing component is chlorine.

10. The process of claim 7 wherein an inert gas is also used.

11. The process of claim 10 wherein said inert gas is nitrogen.

12. In a process for reactivating a reforming catalyst, which includes a platinum- and iridium-containing component composited with a refractory porous inorganic oxide, previously inactivated by coke deposition thereon during contact with a hydrocarbon feed at hydrocarbon conversion conditions and subsequently regenerated by burning at elevated temperatures in the presence of oxygen containing gases to remove accumulated coke deposits therefrom, the improved combination which comprises:
(1) contacting the coke-depleted catalyst with hydrogen or a hydrogen-containing gas at a temperature sufficient to reduce the said platinum and iridium components; and then
(2) contacting said reduced catalyst with dry hydrogen halide in the absence of oxygen or a source thereof at a temperature sufficient to dry said catalyst; and then
(3) contacting said hydrogen chloride treated catalyst with halide in the absence of oxygen or a source thereof at elevated temperatures; and then
(4) contacting said catalyst from said step (3) with a hydrogen-containing gas in the absence of oxygen or a source thereof at a temperature sufficient to reduce the said platinum and iridium components.

13. The process of claim 12 wherein said steps 1-4 are carried out at 0.1-30 atmospheres.

14. The process of claim 13 wherein the dry hydrogen halide in step (3) is in admixture with an inert gas.

15. The process of claim 14 wherein said inert gas is nitrogen.

16. The process of claim 12 where said catalyst also contains rhenium and prior to the first reduction step said catalyst is treated with a mixture of a chlorine-containing component and oxygen.

17. The process of claim 1 wherein said dry hydrogen halide is hydrogen chloride.

18. The process of claim 2 wherein said dry hydrogen halide is hydrogen chloride.

19. The process of claim 3 wherein said dry hydrogen halide is hydrogen chloride.

20. The process of claim 4 wherein said dry hydrogen halide is hydrogen chloride.

21. The process of claim 5 wherein said dry hydrogen halide is hydrogen chloride.

22. The process of claim 6 wherein said dry hydrogen halide is hydrogen chloride.

23. The process of claim 7 wherein said dry hydrogen halide is hydrogen chloride.

24. The process of claim 8 wherein said dry hydrogen halide is hydrogen chloride.

25. The process of claim 9 wherein said dry hydrogen halide is hydrogen chloride.

26. The process of claim 10 wherein said dry hydrogen halide is hydrogen chloride.

27. The process of claim 11 wherein said dry hydrogen halide is hydrogen chloride.

28. The process of claim 12 wherein said dry hydrogen halide is hydrogen chloride.

29. The process of claim 16 wherein said dry hydrogen halide is hydrogen chloride.

* * * * *

UNITED STATES PATENT AND TRADEMARK OFFICE
CERTIFICATE OF CORRECTION

PATENT NO. : 4,359,400
DATED : November 16, 1982
INVENTOR(S) : George R. Landolt, William D. McHale and Hans J. Schoennagel It is certified that error appears in the above-identified patent and that said Letters Patent are hereby corrected as shown below:

Column 4, line 20, change "paticle" to ---particle---

Column 12, line 27, change "chloride" to ---halide--- in Claim 12, line 19

*Signed and Sealed this*

*Seventeenth* Day of *May 1983*

[SEAL]

Attest:

DONALD J. QUIGG

*Attesting Officer*    *Acting Commissioner of Patents and Trademarks*